United States Patent
Paek et al.

(10) Patent No.: US 9,471,737 B1
(45) Date of Patent: Oct. 18, 2016

(54) SEMICONDUCTOR DEVICE WITH DUMMY CELLS OF DIFFERENT DATA TYPES

(71) Applicant: Altera Corporation, San Jose, CA (US)

(72) Inventors: Min Paek, Bayan Lepas (MY); Nor Razman Md Zin, Kulim (MY)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/561,742

(22) Filed: Dec. 5, 2014

(51) Int. Cl.
  *G06F 17/50* (2006.01)
  *H01L 29/66* (2006.01)

(52) U.S. Cl.
  CPC ....... *G06F 17/5072* (2013.01); *H01L 29/6681* (2013.01); *H01L 29/66545* (2013.01)

(58) Field of Classification Search
  CPC .................... G06F 17/5072; H01L 29/66545; H01L 29/6681
  See application file for complete search history.

(56) References Cited

U.S. PATENT DOCUMENTS

| | | |
|---|---|---|
| 6,587,367 B1 | 7/2003 | Nishimura et al. |
| 7,675,124 B2 | 3/2010 | Liaw |
| 7,844,936 B2 | 11/2010 | Melzner |
| 8,332,797 B2 | 12/2012 | Cheng et al. |
| 2004/0027852 A1* | 2/2004 | Watanabe ............. G11C 11/419 365/154 |
| 2005/0044522 A1* | 2/2005 | Maeda ................ G06F 17/5068 716/53 |
| 2006/0289750 A1* | 12/2006 | Yamaguchi ............... G03F 1/38 250/307 |
| 2007/0288879 A1* | 12/2007 | Kobayashi .......... G06F 17/5072 716/54 |
| 2012/0120715 A1* | 5/2012 | Saito ........................ G11C 5/02 365/149 |
| 2013/0016572 A1* | 1/2013 | Kuroda ................. G11C 11/419 365/189.05 |
| 2015/0317425 A1* | 11/2015 | Ding ................... G06F 17/5081 716/112 |

* cited by examiner

*Primary Examiner* — Allan R Wilson

(57) ABSTRACT

A method of designing a semiconductor device is provided. The method includes a step of defining a dummy structure area on the floorplan layout of the semiconductor device. The method also includes a step of adding dummy cells to the dummy structure area. Each dummy cell may be associated with a different data type. The method may improve a design optimization process of dummy cells on the semiconductor device layout by automating the removal process of dummy cells to optimize dummy density. Apart from that, semiconductor devices that are manufactured using the described method, and an apparatus to perform the steps described in the method are also described.

18 Claims, 6 Drawing Sheets

SEMICONDUCTOR DEVICE WITH DUMMY CELLS OF DIFFERENT DATA TYPES

BACKGROUND

An integrated circuit layout is a planar geometrical representation of circuit components in an integrated circuit. The integrated circuit layout may also include details that correspond to metal, oxide, and dielectric layers of the integrated circuit that form the respective circuit components. An integrated circuit device is manufactured based on its integrated circuit layout. The location of the circuit components on the integrated circuit layout will correspond to the location of actual circuit components on a manufactured semiconductor substrate.

The integrated circuit layout may need to be created based on design-for-manufacturing (DFM) rules when placing the circuit components on the integrated circuit layout. One of the DFM rules is a predefined circuit component density. When an actual circuit component density of the integrated circuit layout is out of a predefined circuit component density range, the manufactured integrated circuit may not be functionally reliable.

Generally, the circuit component density for an integrated circuit layout is lower than a minimum to the predefined circuit component density range. Therefore, dummy cells are usually added to the integrated circuit layout to have the predefined circuit component density in between the maximum and minimum of the predefined circuit component density range. However, adding dummy cells in the integrated circuit layout have led to, in most situations, a significant increase in the circuit component density until it is above a maximum of the predefined circuit component density range.

Hence, in those situations, the dummy cells may need to be manually removed until the circuit component density becomes within the predefined circuit component density range. The manual removal of the dummy cells may be time consuming and costly.

SUMMARY

Embodiments described herein include a semiconductor device with dummy cells that is associated with different data types, a method for designing the semiconductor device and an apparatus to perform the method. It should be appreciated that the embodiments can be implemented in numerous ways, such as a process, an apparatus, a system, a device, or a method. Several embodiments are described below.

In one embodiment, a semiconductor device is disclosed. The semiconductor device has a floorplan that includes a dummy structure area. The dummy structure area includes an array of dummy structures that is associated with different data types.

In another embodiment, a method of designing a layout of a semiconductor device is disclosed. The method includes a step to define a dummy structure area on the layout of the semiconductor device. The method also includes a step to add sequence of dummy cells to the dummy structure area. Each dummy cell in the dummy structure area may be associated with a different data type.

In an alternative embodiment, a computer-aided design apparatus for generating a data file for a layout of a semiconductor device is disclosed. The apparatus includes a processor, a memory that is coupled to the processor and a computer-readable medium. The computer-readable medium includes computer program code embedded therein that is configured to cause the processor to perform operations. In one embodiment, the operation may include a step to define a dummy region on the layout of the semiconductor device. In addition to that, the operation may include a step to add a sequence of dummy cells to the dummy region. Each dummy cell within the sequence of dummy cells may be associated with a different data type.

Further features of the invention, its nature and various advantages will be more apparent from the accompanying drawings and the following detailed description of the preferred embodiments.

DETAILED DESCRIPTION

The following embodiments describe a semiconductor device, a method for designing the semiconductor device and apparatus to perform the method. It will be obvious, to one skilled in the art, that the present exemplary embodiments may be practiced without some or all of these specific details. In other instances, well-known operations have not been described in detail in order not to unnecessarily obscure the present embodiments.

Figure 1:
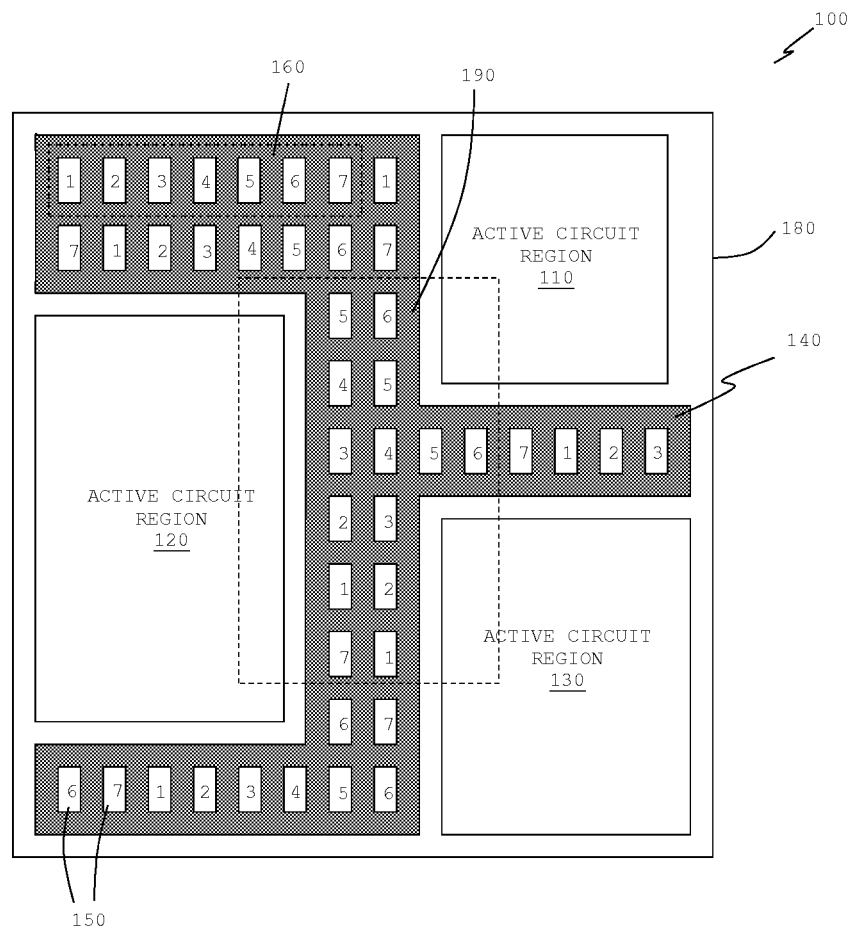
FIG. 1 shows an illustrative a semiconductor device that includes dummy cells associated with different data types in accordance with one embodiment of the present invention.

FIG. 1, meant to be illustrative and not limiting, illustrates a semiconductor device that includes dummy cells associated with different data types in accordance with one embodiment of the present invention. Semiconductor device 100 includes active circuit regions 110, 120 and 130, and dummy structure region 140. Active circuit regions 110, 120 and 130 are located at the peripheral region of semiconductor device 100 with dummy structure region 140 partially surrounding active circuit regions 110, 120 and 130.

In one embodiment, semiconductor device 100 may be an integrated circuit device, such as, application specific integrated circuit (ASIC) device, an application standard specific product (ASSP) device or a programmable logic device (PLD). It should be appreciated that ASIC and ASSP devices perform a fixed and dedicated function whereas a PLD device may be programmable to perform various functions. An example of a PLD device may be a field programmable gate array (FPGA) device.

It should be appreciated that semiconductor device 100 may be designed using an integrated circuit design method that includes circuit placement, routing, simulation, validation and etc. Amongst these steps include a step to place circuit components on a layout. The layout is utilized to manufacture semiconductor device 100. Therefore, there may be a direct correspondence between locations of the circuit components on the layout and the location of circuit components on a manufactured semiconductor device (e.g., semiconductor device 100). In one exemplary embodiment, the layout may include active circuit areas formed on a peripheral area and a dummy structure area that partially surrounds the active circuit areas. The layout may be utilized for manufacturing active circuit regions 110, 120 and 130 and dummy structure region 140 of semiconductor device 100.

In one embodiment, circuit components in a layout may be represented by polygons of various shapes and sizes. The design of the layout may be constrained by fabrication processes of a fabrication plant (e.g., the width of a gate has to be greater than 20 nanometer, etc.). The circuit components of various shapes and sizes on the layout may be utilized to manufacture circuit components on semiconductor device 100. For example, a layout having rectangular active circuit areas may be utilized to manufacture active circuit regions 110, 120 and 130 that are shown as rectangular blocks.

Active circuit regions 110, 120 and 130 may include active circuitry of semiconductor device 100. Generally, the active circuitry may be used to perform the main functions of semiconductor device 100. It should be appreciated that active circuit regions 110, 120 and 130 may be different than a peripheral area of semiconductor device 100 (i.e., portions of region on semiconductor device 100 that lies between the active circuit regions 110, 120 and 130 and scribe lines 180) or any insulated areas (not shown) within semiconductor device 100.

In one embodiment, active circuitry within active circuit regions 110, 120 and 130 may include programmable logic elements in the semiconductor device. The active circuitry, in essence, may include circuit components such as transistors, capacitors, resistors, and the like. It should be appreciated that the active circuitry does not include circuitry that helps to control the manufacturing of the semiconductor device, such as alignment marks, structures for measuring dimensions of features ("critical dimension (CD) bars"), electrical test structures, dummy structures and the like.

Active circuit regions 110, 120 and 130 may also include power supply connections (which supply power to the active circuitry) and signal connections (which transmit signals within the active circuitry). In one embodiment, the signal connections may include a programmable signal routing pathway that is coupled between two or more programmable logic elements.

Referring still to FIG. 1, dummy structure region 140 may be formed to surround sides of active circuit regions 110, 120 and 130. In one embodiment, dummy structure region 140 surrounds three sides of active circuit region 120 and two sides of the respective active circuit regions 110 and 130. Therefore, as shown in the embodiment of FIG. 1, a dummy structure region 140 may occupy a relatively large area on the semiconductor device. In one embodiment, dummy structure region 140 may include a plurality of dummy cells 150.

It should be appreciated that dummy cells 150 include dummy structures that are functionally different than the circuit structures that were described above (e.g., active circuitry within active circuit region 110, 120 or 130). Dummy cells 150 may be placed as part of a design-for-manufacturing (DFM) effort to manufacture circuit components within active circuit regions 110, 120 and 130. Dummy cells 150 may not perform any active function during normal operation of the integrated circuit. In one embodiment, different types of dummy cells 150 are used based on the manner in which they help the DFM effort. For example, dummy cells 150 may include multiple dummy bit lines formed along the outermost edges of a memory array (or an active circuit area) when semiconductor device 100 is a memory device. The dummy bit lines, in such circumstances, may help to manufacture uniformly shaped active bit lines in the memory array. In other circumstances, dummy cells 150 may be dummy etch structures formed next to a highly critical active transistor (i.e., adjacent to an active circuit area such as active circuit region 110, 120 or 130). The dummy etch structure may stabilize an etching rate when an etching process is performed.

Referring still to FIG. 1, dummy cells 150 may be placed relatively close to each other. Therefore, in one embodiment, dummy structure region 140 may be a high-density dummy structure area with tightly packed dummy cells 150. In one embodiment, the distance between two adjacent dummy cells 150 may vary from 3 microns (μm) to 100 μm. It should be appreciated that the high-density dummy structure area 140 may be an outcome of a design process shown in FIG. 5.

As shown in the embodiment of FIG. 1, each dummy cell 150 may be associated with a data type. In one embodiment, there may at least be two different data types of dummy cell 150. In FIG. 1, dummy cells 150 may be associated with seven data types. A different number (i.e., numbers '1' to '7') represents a different data type. The association of dummy cells 150 with the different data types may be practically insignificant after a layout is already utilized to manufacture a semiconductor device. However, the association of the data structures with the dummy cells at the layout design stage may be useful as it may help a layout designer to modify or update the layout more efficiently. For example, a global removal (in contrast to one-by-one removal) of dummy cells of a particular data type may be achieved by having dummy cells associated with different data types on the layout.

Even though only seven data types are shown in the embodiment of FIG. 1, it should be appreciated that there may be fewer or more data types associated with dummy cells 150. In one embodiment, having more data types associated with the dummy cells may provide the layout designer with a finer selection of dummy cells to remove from the layout (assuming the layout designer needs a less densely-populated dummy area). For example, dummy cells on the layout that are associated with 3 data types may have a resolution of 1 out of 3 (33.3%) in contrast to dummy cells associated with 7 data types having a resolution of 1 out of 7 (14.3%). The embodiment having the resolution of 1 out of 7 may provide a finer adjustment when a layout designer needs to modify or update to the layout. However, having a large number of data types may require more computing resources in order to process all the dummy cells in the layout.

Referring still to FIG. 1, dummy cell array 160 is defined as a group of dummy cells 150 that are associated with data types '1' to '7.' In FIG. 1, a first seven horizontally-lined dummy cells 150 that are located at a top left corner of semiconductor device 100 are grouped as a first dummy cell array 160. Similarly, any seven vertically-lined dummy cells 150 that include dummy cells 150 that are associated with data types '1' to '7' may form another dummy cell array such as dummy cell array 160.

As shown in the embodiment of FIG. 1, dummy cell array 160 may be repeated throughout dummy structure region 140. After the first dummy cell array 160, which ends with a data type '7' dummy cell 150, a subsequent dummy cell array may begin with a dummy cell 150 that is associated with data type '1.' Alternatively, dummy cells 150 may be associated with different types of data type sequence than the one shown in the embodiment of FIG. 1. For example, in another semiconductor device, an array of dummy cells 150 may include two data type '1' dummy cells 150 followed by two data type '2' dummy cells 150 in a sequence (e.g., dummy cells 150 with data type '1122'). It should be appreciated that the type of data that is assigned to a particular dummy cell 150 may depend on the layout designer or the circuit design.

In one embodiment, different data types for respective dummy cells 150 may be used to refer to different structural properties of dummy cells 150. For example, the different structural properties of dummy cells 150 may include dummy cells 150 of different widths, or dummy cells 150 of different shapes. Therefore, in one scenario, dummy cell 150 with data type '1' may have different structural properties compared to dummy cell 150 with data type '2.'

It should be appreciated that the structural properties represented by the different data types may vary based on the type of dummy cells that in a particular dummy area. For example, when dummy cells 150 are dummy bit lines, dummy cells 150 with different data types may vary in terms of their widths. In contrast, when dummy cells 150 are dummy etch structures, dummy cells 150 with different data types may vary in terms of their area size.

In another embodiment, dummy cells 150 associated with different data types may have identical dummy structural properties. It should be appreciated that even in this instance, dummy cells 150 may still be assigned with data types '1' to '7.'

Therefore, in both embodiments described above (i.e., one having different structural properties and one having identical structural properties for different data types), dummy cells 150 with different data types may be easily referred to within a circuit layout when designing semiconductor device 100. The assignment may aid optimization of dummy density when performing a layout optimization of semiconductor device 100. The optimization step is described in detail with reference to the illustrative flowchart of FIG. 5.

In one embodiment, semiconductor device 100 may include critical dummy density sub-region 190. Critical dummy density sub-region 190 may be utilized for sensitive active region where even a small variation in process to form the active region and the dummy structures may cause a device to fail. Hence, critical dummy density sub-region 190 is significantly sensitive compared to other dummy density region on semiconductor device 100. It should be appreciated that the critical dummy density sub-region 190 may be common in a large semiconductor device (e.g., an FPGA device or a memory device). In one scenario, during the designing of layout stage, updates or modifications at critical dummy density sub-region 190 may be performed separately from other layout areas of semiconductor device 100.

Figure 2:
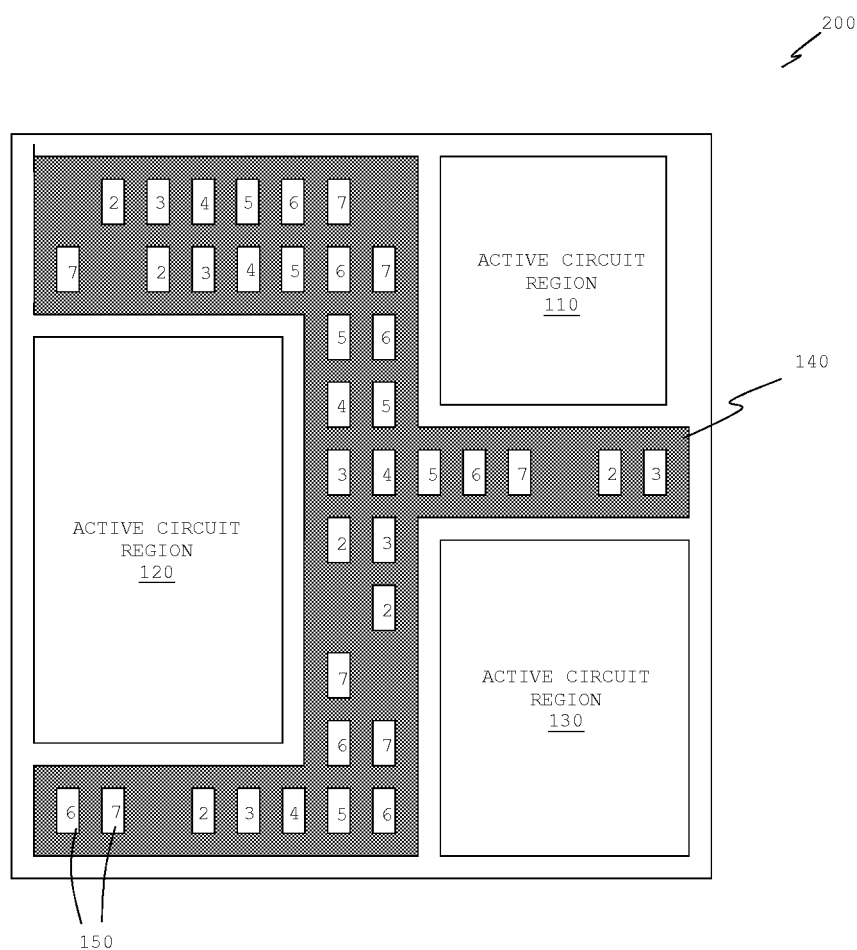
FIG. 2 shows an illustrative semiconductor device that has a lower dummy cell density than semiconductor device 100 of FIG. 1 in accordance with one embodiment of the present invention.

FIG. 2, meant to be illustrative and not limiting, illustrates semiconductor device 200 that has a lower dummy density than semiconductor device 100 of FIG. 1 in accordance with one embodiment of the present invention. Semiconductor device 200 may be similar to semiconductor device 100 of FIG. 1 with the exception that dummy cells 150 with the data type '1' are not manufactured. For the sake of brevity, active circuit regions 110, 120 and 130 and dummy structure region 140, which are similar to active circuit regions 110, 120 and 130 and dummy structure region 140 of FIG. 1, will not be described again.

The gaps at the locations where dummy cells 150 of data type '1' were present on semiconductor device 100 of FIG. 1 may provide for a lower dummy density for semiconductor device 200 compared to semiconductor device 100 of FIG. 1. As shown in the embodiment of FIG. 2, semiconductor device 200 has seven gaps. In one embodiment, the gaps may also be referred to as a region on the semiconductor device 200 that is devoid of any dummy structures.

It should be noted that the dummy density of a semiconductor device may depend on various factors, such as the design of the device. The layout designer may, after multiple trials, obtain a range of optimized dummy density for that semiconductor device as part of a DFM effort. In one embodiment, the range of optimized dummy density may be referred to as a range of predefined dummy density.

Therefore, in one embodiment, an initial circuit layout of semiconductor device 200 may be similar to a circuit layout of semiconductor device 100 of FIG. 1. However, given that the dummy density is greater than a maximum to the predefined dummy density range, the dummy cells of a particular data type may be removed. In this embodiment, dummy cells 150 with data type '1' are removed. Hence, the layout of semiconductor device 200 may not have dummy cells 150 with data type '1.'

Figure 3:
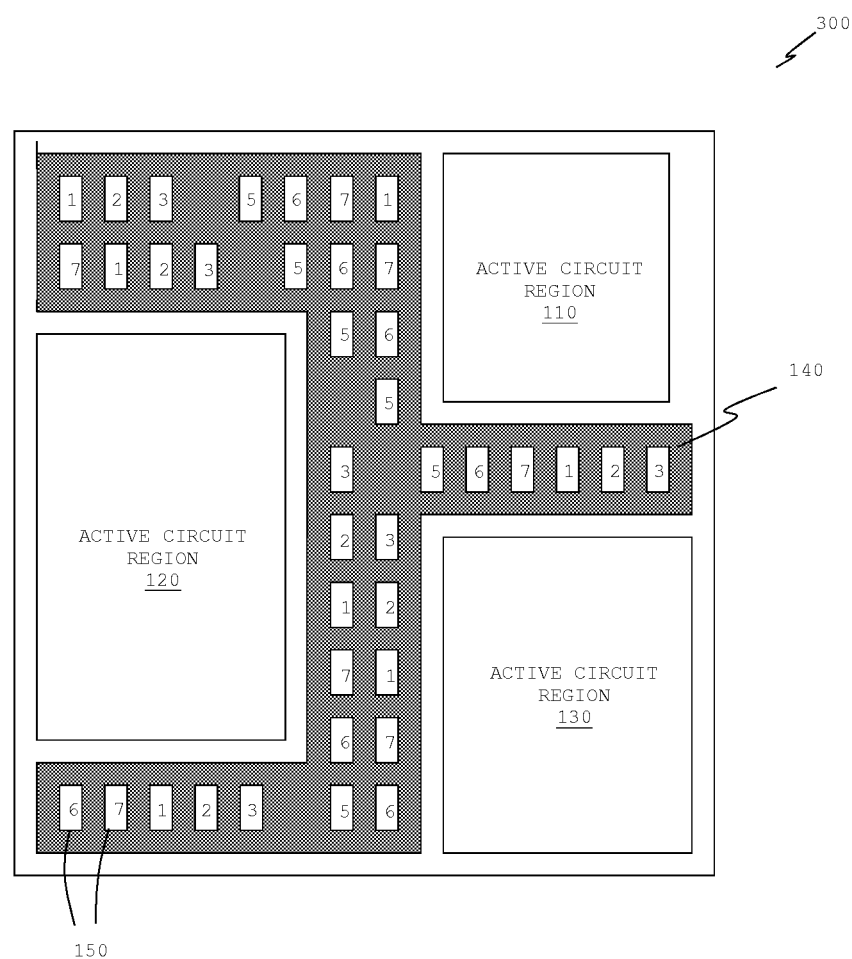
FIG. 3 shows an illustrative semiconductor device with a lower dummy cell density than semiconductor device 100 of FIG. 1 but a higher dummy cell density than semiconductor device 200 of FIG. 2 in accordance with one embodiment of the present invention.

FIG. 3, meant to be illustrative and not limiting, illustrates semiconductor device 300 with a lower dummy density than semiconductor device 100 of FIG. 1 but a higher dummy density than semiconductor device 200 of FIG. 2 in accordance with one embodiment of the present invention. Semiconductor device 300 may be similar to semiconductor device 100 of FIG. 1 with the exception that dummy cells 150 with data type '4' are not manufactured. Therefore, similar to semiconductor device 200 of FIG. 2, semiconductor device 300 may also have a lower dummy density compared to semiconductor device 100 of FIG. 1. However, semiconductor device 300 may have a higher dummy density compared to semiconductor device 200 of FIG. 2 because semiconductor device 300 has only five gaps (i.e., five fewer dummy cells 150 compared to semiconductor device 100 of FIG. 1) as compared to semiconductor device 200 of FIG. 2 that has seven gaps (i.e., seven fewer dummy cells 150 compared to semiconductor device 100 of FIG. 1). Similar to semiconductor device 200 of FIG. 2, dummy cells 150 with data type '4' may be removed at the design stage. In one embodiment, dummy cells 150 with the data type '4' may be chosen in this instance instead of dummy cells with data type '1' as shown in FIG. 2 because the circuit designer (with the help of a computer-aided tool) may decide to perform minimal adjustments to the dummy density in dummy structure region 140 as the difference between the dummy density for semiconductor device 300 and a maximum to the predefined dummy density range is relatively small.

Figure 4:
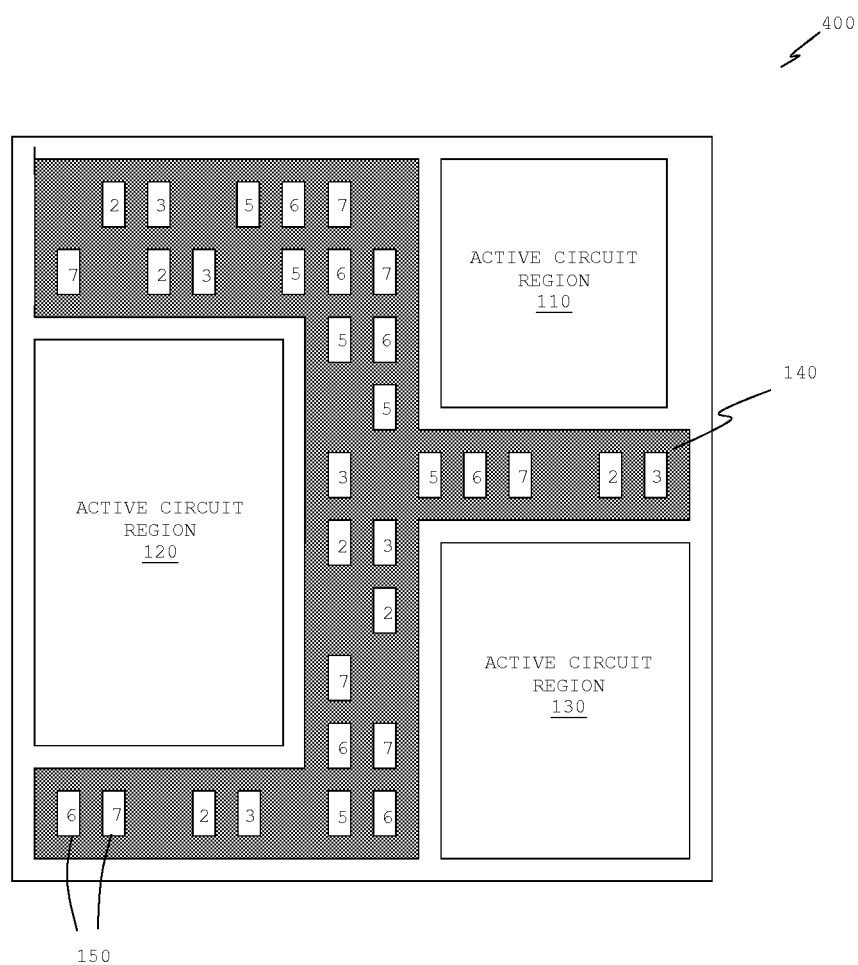
FIG. 4 shows an illustrative semiconductor device with a low dummy cell density in dummy structure area in accordance with one embodiment of the present invention.

FIG. 4, meant to be illustrative and not limiting, illustrates semiconductor device 400 with a low dummy density in dummy structure region 140 in accordance with one embodiment of the present invention. Semiconductor device 400 may have a lowest dummy density compared to semiconductor devices 100, 200 and 300 of respective FIGS. 1, 2 and 3. As shown in FIG. 4, semiconductor device 400 has twelve gaps. Semiconductor device 400 may be similar to semiconductor device 100 of FIG. 1, with the exception that dummy cells 150 with data types '1' and '4' are not manufactured. In one scenario, dummy cells 150 with data types '1' and '4' may be removed at a designing stage. In one embodiment, dummy cells 150 with the data types of '1' and '4' are removed in a sequential manner at the designing stage. For example, when the dummy density in dummy structure area 400 is significantly larger than a maximum to the predefined dummy density range, dummy cells 150 with data type '1' may be initially removed. However, if the dummy density in dummy structure area 400 is still high even after the removal of dummy cells 150 with data type '1,' additional dummy cells 150 may be removed (e.g., dummy cells 150 with data type of '4'). Therefore, the removal of dummy cells 150 with data types '1' and '4' from the layout of the device may be reflected in the actual device (e.g., semiconductor device 400 of FIG. 4).

Figure 5:
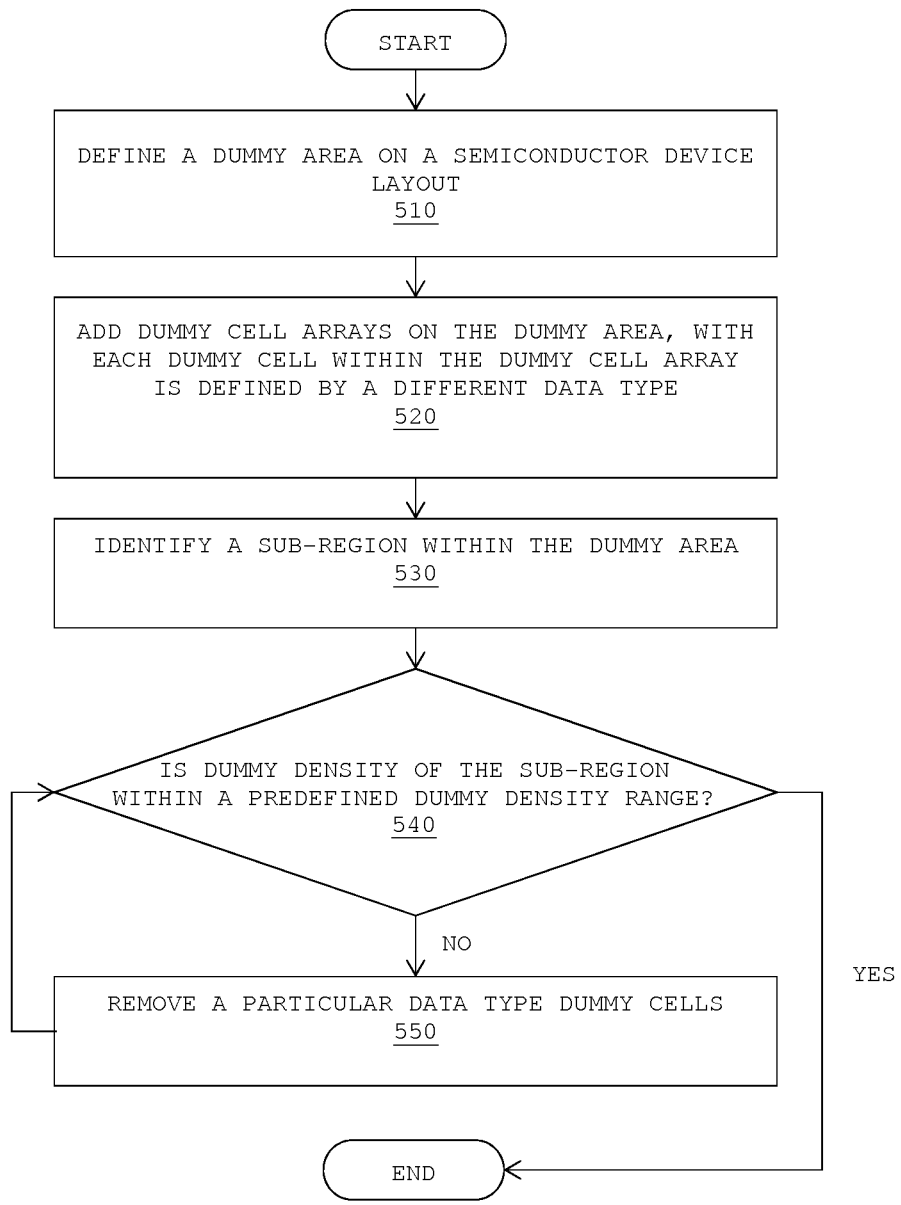
FIG. 5 shows an illustrative flowchart of a method of designing a semiconductor device in accordance with one embodiment of the present invention.

FIG. 5, meant to be illustrative and not limiting, illustrates an illustrative flowchart of a method of designing a semiconductor device in accordance with one embodiment of the present invention. The method may be performed using a computer-aided design (CAD) software, for example, Cadence software (DFII, Cadence Inc., San Jose, Calif.). In one embodiment, the method is performed as a part of circuit layout design process within a semiconductor designing process flow.

At step 510, a dummy area is defined on a semiconductor device layout. In one embodiment, the semiconductor device layout may be utilized to manufacture semiconductor device 100, 200, 300 or 400 of the respective FIGS. 1-4. The dummy area may be added to the semiconductor device layout for various reasons as described above with reference to FIG. 1. In one embodiment, the dummy area may be added to improve the manufacturing of repetitive structures. It should be appreciated that at this stage, the dummy area may not include any dummy cells. The dummy area defined on the semiconductor device layout may be manufactured as dummy structure region 140 as shown in FIGS. 1-4. In one embodiment, the dummy area may be defined on the semiconductor device layout after the placement of active circuit areas on the semiconductor device layout. The dummy area may be placed such that it surrounds the active circuit areas. As shown in FIGS. 1-4, dummy structure region 140 may partially surround active circuit regions 110, 120 and 130.

At step 520, dummy cell arrays are added to the dummy area on the semiconductor device layout. In one embodiment, a dummy cell array may be similar to dummy cell array 160 of FIG. 1. Dummy cells in the dummy cell array may have different data types. For example, a dummy cell array with seven dummy cells may have seven different data types that are numerically represented by '1' to '7.' In one scenario, the pattern of data sequence assigned to the dummy cells within a dummy cell array may be identical across every dummy cell arrays. In one embodiment, the dummy cells within the dummy cell array may represent dummy structures on the actual semiconductor device (e.g., dummy etch structures or dummy bit lines).

In one embodiment, the dummy cell array may be added on to the dummy area of a semiconductor device layout by performing a mathematical "AND" operation between a semiconductor device layout that has a defined dummy area and an intermediary layer that is filled with dummy cells. As a result, the dummy cells are placed within the dummy area defined on the semiconductor device layout.

At step 530, a sub-region within the dummy area is identified. In one embodiment, the sub-region may encompass an area similar to critical dummy density sub-region 190 of FIG. 1. The sub-region may be identified when there is a different dummy density criticality profile on a single semiconductor device layout. Therefore, in one embodiment, a sub-region within the semiconductor device layout with higher critical dummy density may be selected. For example, when manufacturing highly repetitive bit lines in an active circuit area, a higher dummy density may be required at the dummy area that is nearer to the active circuit area. In contrast, when manufacturing analog circuits in the active circuit area, a lower dummy density may suffice at the dummy area that is nearer to the active circuit area.

It should be appreciated that step 530 may not be needed if the whole semiconductor device layout has a single dummy density criticality profile. Semiconductor devices 100, 200, 300 and 400 of FIGS. 1-4 are shown to have a single dummy density criticality profile throughout the semiconductor device layout.

At step 540, a dummy density of the sub-region is determined and compared to see whether the dummy density if within a predefined dummy density range. It should be appreciated that the dummy density is defined as a total area of dummy cells in that sub-region divided by the total area of the sub-region. Therefore, having a high number dummy cells in that area may provide a high dummy density. As described above with reference to FIG. 1, a high dummy density sub-region (usually with a dummy density that is higher than a maximum to the predefined dummy density range) may usually include densely-packed dummy cells.

When the dummy density in the dummy area is within the predefined dummy density range, the method ends. However, when the dummy density is greater than the maximum to the predefined dummy density range, the method proceeds to step 550.

At step 550, dummy cells with a particular data type may be removed. The selection of the dummy cells with a particular data type may be based on the number of dummy cells with that data type available in that sub-region. For example, there are seven dummy cells 150 with data type '1' and there are only five dummy cells 150 with data type '4' on semiconductor device 100 of FIG. 1. Hence, if the difference between the dummy density and the maximum to the predefined dummy density range is significantly high, then the data type with the greater number of dummy cells may be selected (e.g., in this instance, dummy cells 150 with data type '1'). In one exemplary embodiment, the removal of dummy cells with data type '1' may generate a semiconductor device layout that may be used to manufacture semiconductor device 200 of FIG. 2. Alternatively, the removal of dummy cells with data type '4' may generate a semiconductor device layout that may be used to manufacture semiconductor device 300 of FIG. 3.

Once the dummy cells of a particular data type have been removed, the method loops back to step 540. At this stage, the dummy density of the sub-region is determined again and is compared again to see whether the dummy density if within the predefined dummy density range. If the dummy density of the sub-region is still greater than the maximum to the predefined dummy density range, the method proceeds to step 550 and dummy cells with a different data type may be removed. In one embodiment, when an initial removal was for dummy cells with data type '1,', the later removal may be the removal of dummy cells with data type '4.' A semiconductor device layout that has dummy cells with data type '1' and '4' removed may be used to manufacture semiconductor device 400 of FIG. 4.

It should be appreciated that the method may continue to loop between steps 540 and 550 until the dummy density of the sub-region is identical to the predefined dummy density. Once the dummy density of the sub-region is within the predefined dummy density range, the method ends.

Figure 6:
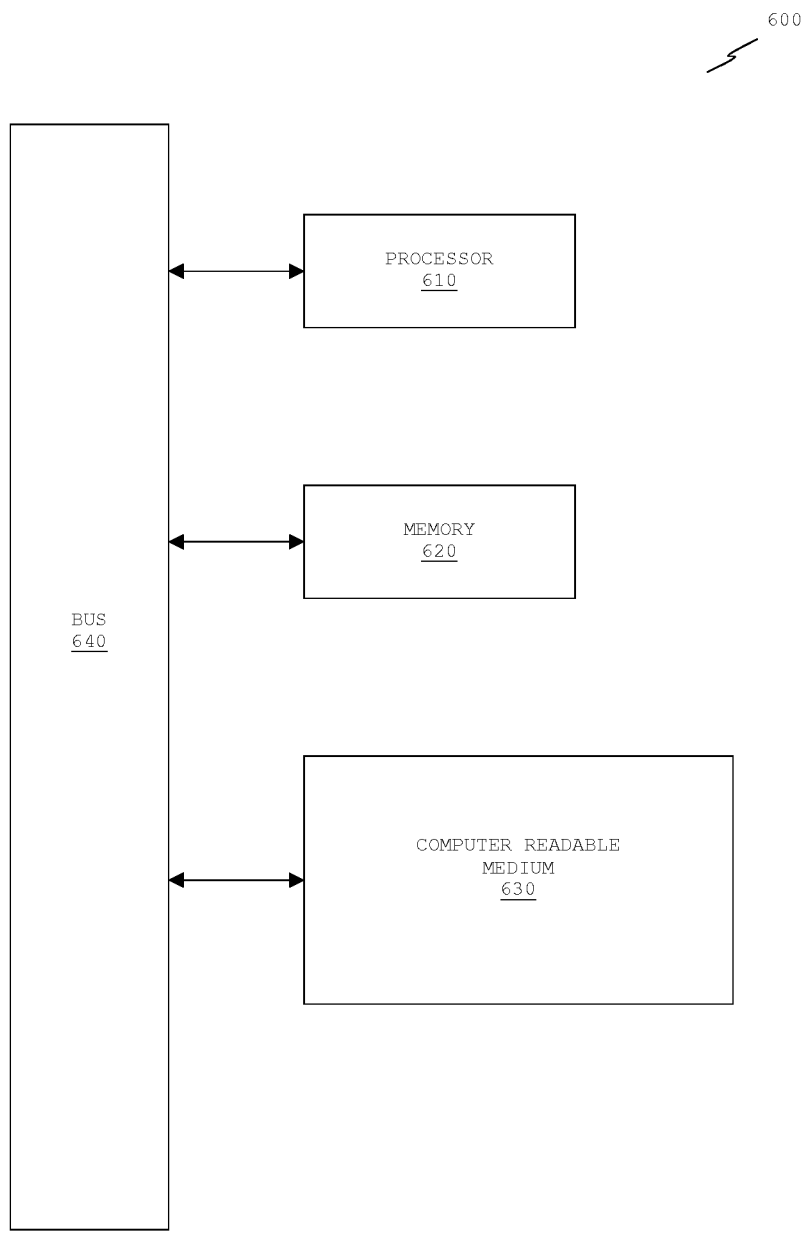
FIG. 6 shows an illustrative a computer equipment for generating an integrated circuit configuration data file in accordance with one embodiment of the present invention.

FIG. 6, meant to be illustrative and not limiting, illustrate a computer equipment for generating an integrated circuit configuration data file in accordance with one embodiment of the present invention. Computer equipment 600 may be utilized for generating a data file for a semiconductor device layout or floorplan (e.g., a floorplan to manufacture either semiconductor device 100, 200, 300 or 400 of respective FIGS. 1, 2, 3 and 4). Computer equipment 600 includes processor 610, memory 620, computer-readable medium 630 and bus 640. Processor 610 may communicate with computer-readable medium 630 and memory 620 using bus 640.

Computer-readable medium 630 may include computer-readable instructions. In one embodiment, the computer-readable instructions may include a sequence of steps for processor 610 to execute. In one embodiment, the computer-readable instructions may include a sequence of steps similar to the steps shown in FIG. 5. Hence, processor 610 may perform any or all of steps 510 through 550 of FIG. 5. In one embodiment, an outcome of processor 610 after performing steps 510 through 550 of FIG. 5 may be a semiconductor device layout that may be used to manufacture semiconductor device 100, 200, 300 or 400 of FIGS. 1-4.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by ALTERA Corporation.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

Although the foregoing invention has been described in some detail for the purposes of clarity, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A semiconductor device, comprising:
   a substrate; and
   an array of dummy structures that is formed in the substrate, wherein each dummy structure in the array of dummy structures is associated with a data type selected from a plurality of different data types, wherein a sub-region of the array of dummy structures is devoid of dummy cells associated with a first data type of the plurality of data types, and wherein the sub-region of the array of dummy structures has a manufacturing design density within a predetermined manufacturing design density range.

2. The semiconductor device as defined in claim 1, wherein the plurality of different data types comprises at least two different data types.

3. The semiconductor device as defined in claim 1, further comprising:
   another array of dummy structures that is formed adjacent to the array of dummy structures on the substrate, wherein a first dummy structure within both of the arrays are associated with a common data type.

4. The semiconductor device as defined in claim 3, wherein each dummy structure that is associated with the first data type in the plurality of different data types is structurally identical with each dummy structure that is associated with a second data type in the plurality of different data types.

5. The semiconductor device as defined in claim 1, wherein each dummy structure that is associated with the first data type in the plurality of different data types is structurally different than each dummy structure that is associated with a second data type in the plurality of different data types.

6. The semiconductor device as defined in claim 5, wherein each dummy structure that is associated with the first data type in the plurality of different data types has a different physical shape than each dummy structure that is associated with a second data type in the plurality of different data types.

7. The semiconductor device as defined in claim 1, wherein at least some of the dummy structures in the array of dummy structures surround an area on the substrate that is devoid of any dummy structures.

8. A method of designing a floorplan layout of a semiconductor device, comprising:
   defining a dummy structure region on the floorplan layout of the semiconductor device;
   adding a plurality of dummy cells to the dummy structure region, wherein each dummy cell in the plurality of dummy cells is associated with a respective different data type;
   identifying a subset of the plurality of dummy cells, wherein dummy cells in the subset of the plurality of dummy cells are associated with a first data type;

determining whether a sub-region within the floorplan layout has a manufacturing design density that is within a predefined manufacturing design density range; and removing dummy cells of the plurality of dummy cells from the sub-region that are associated with the first data type in response to determining that the manufacturing design density is greater than the predefined manufacturing design density range.

9. The method as defined in claim 8, further comprising: adding another plurality of dummy cells to the floorplan layout of the semiconductor device, wherein a first portion of dummy cells in the plurality of dummy cells and in the another plurality of dummy cells are associated with an identical data type.

10. The method as defined in claim 8, further comprising: defining an active region that is located adjacent to the dummy structure region on the floorplan layout of the semiconductor device.

11. The method as defined in claim 10, wherein the active area comprises transistors, capacitors, inductors and resistors.

12. The method as defined in claim 8, wherein the subset of the plurality of dummy cells comprises a first subset of the plurality of dummy cells, the method further comprising:

after the removal of the first subset of the plurality of dummy cells, re-determining whether the manufacturing design density of the sub-region within the floorplan layout is within the predefined manufacturing design density range; and identifying a second subset of the plurality of dummy cells in response to re-determining that the manufacturing design density is greater than the predefined manufacturing design density range, wherein dummy cells in the second subset of the plurality of dummy cells are associated with a second data type that is available within the sub-region; and removing the second subset of the plurality of dummy cells.

13. The method as defined in claim 8, wherein the second subset of the plurality of dummy cells is identified based on a number of dummy cells that are associated with the second data type within the sub-region.

14. The method as defined in claim 8, further comprising: determining whether another sub-region within the floorplan layout of the semiconductor device has a manufacturing design density that is within the predefined manufacturing design density range; and in response to determining that the manufacturing design density in the another sub-region is greater than the predefined manufacturing design density range, identifying a third subset of the plurality of dummy cells, wherein dummy cells in the third subset of the plurality of dummy cells are associated with a third data type that is available within the another sub-region; and removing the third subset of the plurality of dummy cells.

15. Computer equipment for generating an integrated circuit configuration data file, comprising:
a processor;
a memory coupled to the processor; and
a non-transitory computer-readable medium that stores computer program instructions configured to cause the processor to perform operations of:
defining a dummy region on the semiconductor device;
adding a sequence of dummy cells to the dummy region, wherein each dummy cell in the sequence of dummy cells is associated with a different data type;
determining whether a manufacturing design density of a sub-region of the semiconductor device is within a user-defined manufacturing design density range; and
in response to determining that the manufacturing design density is outside of the user-defined manufacturing design density range, selecting a particular data type that is available within the sub-region and removing dummy cells that are associated with the available data type from the sub-region.

16. The computer equipment as defined in claim 15, wherein the computer program code further configures to cause the processor to perform operations of:
when the manufacturing design density remains outside of the user-defined manufacturing design density range even after removal of the dummy cells that are associated with the data type, selecting another data type that is available within the sub-region and removing dummy cells that are associated with the another data type within the sub-region.

17. The computer equipment as defined in claim 15, wherein the computer program code further configures to cause the processor to perform operations of:
checking whether a manufacturing design density of another sub-region on the semiconductor device is within the user-defined manufacturing design density range; and
when the manufacturing design density is outside of the user-defined manufacturing design density, selecting a data type that is available within the another sub-region and removing dummy cells that are associated with the available data type from the another sub-region.

18. The computer equipment as defined in claim 15, wherein the computer program code further configures to cause the processor to perform operations of:
adding an active region that is located adjacent to the dummy region on the semiconductor device.

\* \* \* \* \*